(12) United States Patent
Li et al.

(10) Patent No.: US 11,535,544 B2
(45) Date of Patent: Dec. 27, 2022

(54) DEVICE FOR TREATMENT OF ORGANIC WASTE

(71) Applicant: Hebei University of Science and Technology, Shijiazhuang (CN)

(72) Inventors: Zaixing Li, Shijiazhuang (CN); Jun Ma, Shijiazhuang (CN); Xiaosha Wu, Shijiazhuang (CN); Yali Huang, Shijiazhuang (CN); Xuebin Han, Shijiazhuang (CN); Xue Qin, Shijiazhuang (CN); Shuang Liu, Shijiazhuang (CN)

(73) Assignee: HEBEI UNIVERSITY OF SCIENCE AND TECHNOLOGY, Shijiazhuang (CN)

( * ) Notice: Subject to any disclaimer, the term of this patent is extended or adjusted under 35 U.S.C. 154(b) by 116 days.

(21) Appl. No.: 17/106,169

(22) Filed: Nov. 29, 2020

(65) Prior Publication Data

US 2022/0009810 A1 Jan. 13, 2022

(30) Foreign Application Priority Data

Jul. 9, 2020 (CN) .......................... 202021340826.X

(51) Int. Cl.
*C02F 9/00* (2006.01)
*C02F 1/02* (2006.01)
*C02F 101/30* (2006.01)

(52) U.S. Cl.
CPC ................ *C02F 9/00* (2013.01); *C02F 1/025* (2013.01); *C02F 2101/30* (2013.01);
(Continued)

(58) Field of Classification Search
CPC ........ C02F 9/00; C02F 1/025; C02F 2101/30; C02F 2209/02; C02F 2209/225;
(Continued)

(56) References Cited

U.S. PATENT DOCUMENTS

| 6,096,283 A * | 8/2000 | Cooper ..................... G21F 9/06 |
| | | 210/759 |
| 6,110,727 A * | 8/2000 | Widmer .................. B01F 27/62 |
| | | 210/603 |

(Continued)

FOREIGN PATENT DOCUMENTS

| CN | 205076959 U | * | 3/2016 | ............ Y02W 10/20 |
| CN | 207143065 U | * | 3/2018 | .............. C02F 11/04 |

(Continued)

*Primary Examiner* — Nam X Nguyen
*Assistant Examiner* — Ekandra S. Miller-Cruz
(74) *Attorney, Agent, or Firm* — Matthias Scholl P.C.; Matthias Scholl

(57) ABSTRACT

A device for treatment of organic waste includes a heating unit, a hydrolysis tank, a regulating tank, an aerobic fermentation reactor, an organic waste feeder, an aerobe feeder, a delivery mechanism, a deodorization unit, and an air distributor. The hydrolysis tank is connected to the regulating tank, and the regulating tank is connected to the aerobic fermentation reactor. The delivery mechanism is disposed between the regulating tank and the aerobic fermentation reactor. The heating unit is connected to the hydrolysis tank and is configured to heat an organic material in the hydrolysis tank. The organic waste feeder and the aerobe feeder are connected to the regulating tank. The deodorization unit is disposed on and connected to the aerobic fermentation reactor. The air distributor is disposed in the aerobic fermentation reactor and is configured to provide oxygen to the aerobic fermentation reactor.

11 Claims, 3 Drawing Sheets

(52) U.S. Cl.
CPC .... *C02F 2209/02* (2013.01); *C02F 2209/225* (2013.01); *C02F 2209/38* (2013.01); *C02F 2303/02* (2013.01)

(58) Field of Classification Search
CPC .. C02F 2209/38; C02F 2303/02; C02F 11/02; C02F 11/18; B09B 3/00; Y02W 10/20; Y02W 30/40
USPC ........................................................ 210/202
See application file for complete search history.

(56) References Cited

U.S. PATENT DOCUMENTS

| | | | | |
|---|---|---|---|---|
| 7,422,894 | B2 * | 9/2008 | Tratt ................. | A01K 67/0332 |
| | | | | 435/290.3 |
| 2005/0019139 | A1 * | 1/2005 | Aoyama ................... | B09B 3/40 |
| | | | | 414/147 |
| 2021/0009448 | A1 * | 1/2021 | Wang ........................ | C02F 9/00 |

FOREIGN PATENT DOCUMENTS

| | | | | | |
|---|---|---|---|---|---|
| CN | | 20080027480 A | * | 3/2018 | ................. C05I 5/00 |
| CN | | 108640455 A | * | 10/2018 | ............. B01D 53/82 |
| CN | WO-2020006773 A1 | * | 1/2020 | ............. C02F 11/02 |

* cited by examiner

DEVICE FOR TREATMENT OF ORGANIC WASTE

CROSS-REFERENCE TO RELATED APPLICATIONS

Pursuant to 35 U.S.C. § 119 and the Paris Convention Treaty, this application claims foreign priority to Chinese Patent Application No. 202021340826.X filed on Jul. 9, 2020, the contents of all of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a device for treatment of organic waste.

High temperature aerobic composting technology is an important means for recycling and harmless treatment of organic waste. Aerobic microorganisms used in high temperature aerobic composting can oxidize, decompose, absorb the organic wastes, remove odor, toxic and harmful substances and insect eggs in the organic wastes, and finally transform the organic waste into fermentation products rich in humus. The fermentation products rich in humus can be applied to farmland thus realizing the cyclic utilization of organic waste. However, the following disadvantages are associated with the high temperature aerobic composting. First, in the process of aerobic composting, organic agricultural wastes such as livestock manure are rich in macromolecular organic matters such as lignin and cellulose. These macromolecular organic matters have high crystallinity, which makes it difficult to degrade and the degradation is insufficient. Therefore, there are low nutrient conversion rate and large loss of carbon and nitrogen nutrients in the fermentation process, so it is difficult to form high-quality and high maturity fermentation products. Second, aerobic composting has a long fermentation cycle and slow humification process, which tends to produce secondary pollution such as malodorous gases.

SUMMARY

The disclosure provides a device for treatment of organic waste so as to solve the disadvantages of conventional organic waste treatment such as long fermentation cycle, slow humification process, and potential secondary pollution such as odor.

The device for treatment of organic waste of the disclosure comprises a heating unit, a hydrolysis tank, a regulating tank, an aerobic fermentation reactor, an organic waste feeder, an aerobe feeder, a delivery mechanism, a deodorization unit, and an air distributor. The hydrolysis tank is connected to the regulating tank, and the regulating tank is connected to the aerobic fermentation reactor; the delivery mechanism is disposed between the regulating tank and the aerobic fermentation reactor; the heating unit is connected to the hydrolysis tank and is configured to heat an organic material in the hydrolysis tank; the organic waste feeder and the aerobe feeder are connected to the regulating tank and are configured to regulate a moisture content and carbon-nitrogen (C/N) ratio of the organic material and an inoculation proportion of an aerobe in the regulating tank; the deodorization unit is disposed on and connected to the aerobic fermentation reactor and is configured to absorb odor produced in the aerobic fermentation reactor; the air distributor is disposed in the aerobic fermentation reactor and is configured to provide oxygen to the aerobic fermentation reactor.

In a class of this embodiment, the device further comprises a peristaltic pump disposed between the hydrolysis tank and the regulating tank.

In a class of this embodiment, the device further comprises an organic waste storage tank connected to the hydrolysis tank.

In a class of this embodiment, the peristaltic pump is also disposed between the hydrolysis tank and the organic waste storage tank.

In a class of this embodiment, the delivery mechanism comprises a conveyer belt; the conveyer belt comprises a first end and a second end; the regulating tank comprises a discharge outlet and the aerobic fermentation reactor comprises a feed inlet; the first end is disposed below the discharge outlet and the second end is disposed over the feed inlet.

In a class of this embodiment, the delivery mechanism comprises a transportation rail, a loading car movable on the transportation rail, and a driving shaft configured to drive the loading car to move on the transportation rail; the regulating tank comprises a discharge outlet and the aerobic fermentation reactor comprises a feed inlet; the transportation rail comprises a first end and a second end; the first end is disposed below the discharge outlet; the second end is arc-shaped and is disposed over the feed inlet.

In a class of this embodiment, the transportation rail comprises a horizontal part disposed below the discharge outlet, a vertical part perpendicularly connected to the horizontal part, and an arc-shaped part disposed over the feed inlet; a first driving shaft and a second driving shaft are disposed on two ends of the horizontal part, respectively, to drive the loading car to move back and forth on the horizontal part; a third driving shaft is disposed on one end of the arc-shaped part to drive the loading car to move back and forth on the horizontal part and vertical part.

In a class of this embodiment, the device further comprises a stirrer disposed in the hydrolysis tank and/or in the regulating tank and/or in the aerobic fermentation reactor.

In a class of this embodiment, the device further comprises a temperature monitor disposed in the hydrolysis tank.

In a class of this embodiment, the device further comprises a humidity and temperature monitor disposed in the aerobic fermentation reactor.

In a class of this embodiment, the heating unit comprises a heating jacket filled with circulating water and a heater communicating with the heating jacket to heat the circulating water; the heating jacket is disposed around the hydrolysis tank; the heating jacket comprises a water inlet and a water outlet both connected to the heater; when in use, water discharged from the water outlet flows back to the heater, is heated therein, and enters the heating jacket via the water inlet.

In a class of this embodiment, the air distributor comprises a U-shaped plate disposed in the aerobic fermentation reactor, an interlayer formed between the U-shaped plate and in the aerobic fermentation reactor, and an aeration pump communicating with the interlayer; the U-shaped plate comprises a plurality of holes for distributing air.

In a class of this embodiment, the air distributor comprises a plurality of aeration pumps.

In a class of this embodiment, the device further comprises a collector disposed below the aerobic fermentation reactor configured to collect a leachate produced from the aerobic fermentation reactor.

In a class of this embodiment, the collector is disposed below the U-shaped plate; the leachate passes through the plurality of holes and is collected by the collector; and the collector is fixedly secured to the U-shaped plate.

Figure 1:
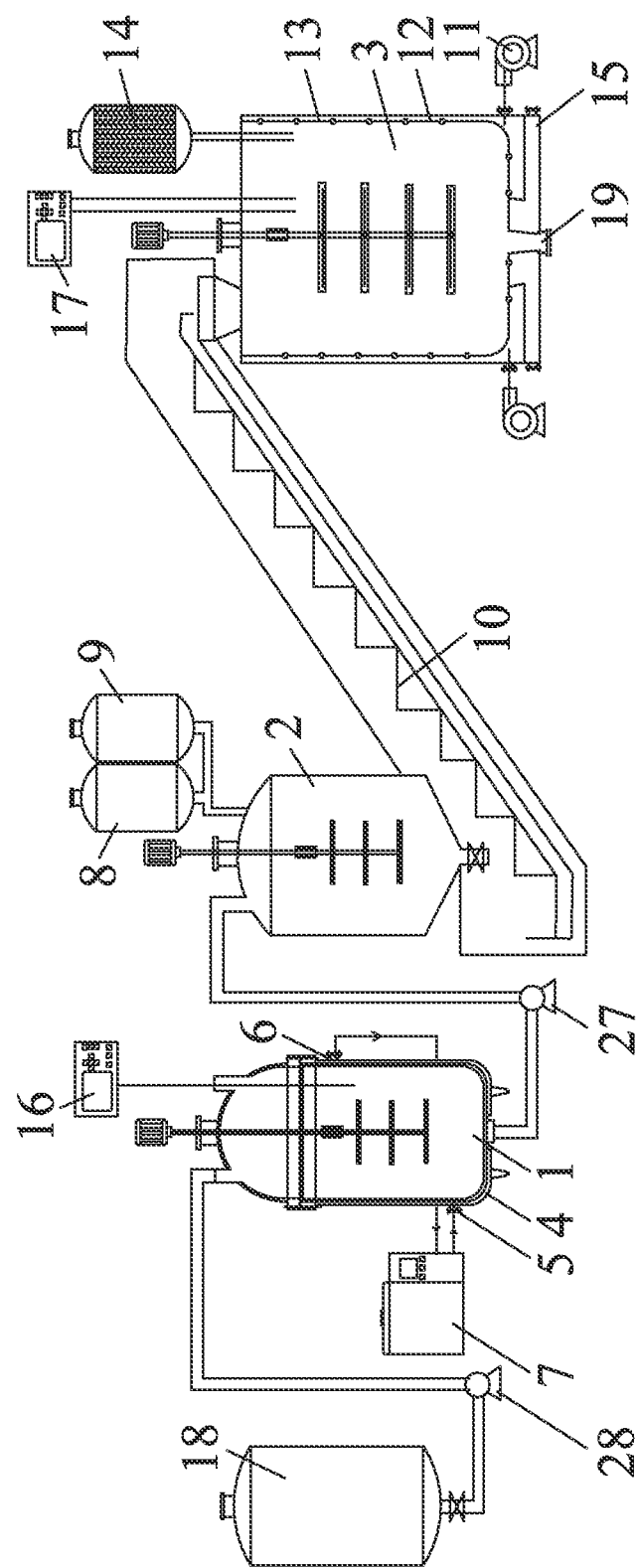
FIG. 1 is schematic diagram of a device for treatment of organic waste comprising a conveyer belt according to one embodiment of the disclosure.

In the drawings, the following reference numbers are used: 1. Hydrolysis tank; 2. Regulating tank; 3. Aerobic fermentation reactor; 4. Heating jacket; 5. Water inlet; 6. Water outlet; 7. Heater; 8. Organic waste feeder; 9. Aerobe feeder; 10. Conveyer belt; 11. Aeration pump; 12. U-shaped plate; 13. Hole; 14. Deodorization unit; 15. Collector; 16. Temperature monitor; 17. Humidity and temperature monitor; 18. Organic waste storage tank; 19. Exit; 20. Horizontal part; 21. Vertical part; 22. Arc-shaped part; 23. Loading car; 24. First driving shaft; 25. Second driving shaft; 26. Third driving shaft.

DETAILED DESCRIPTION

To further illustrate, embodiments detailing a device for treatment of organic waste are described below. It should be noted that the following embodiments are intended to describe and not to limit the disclosure.

Figure 2:
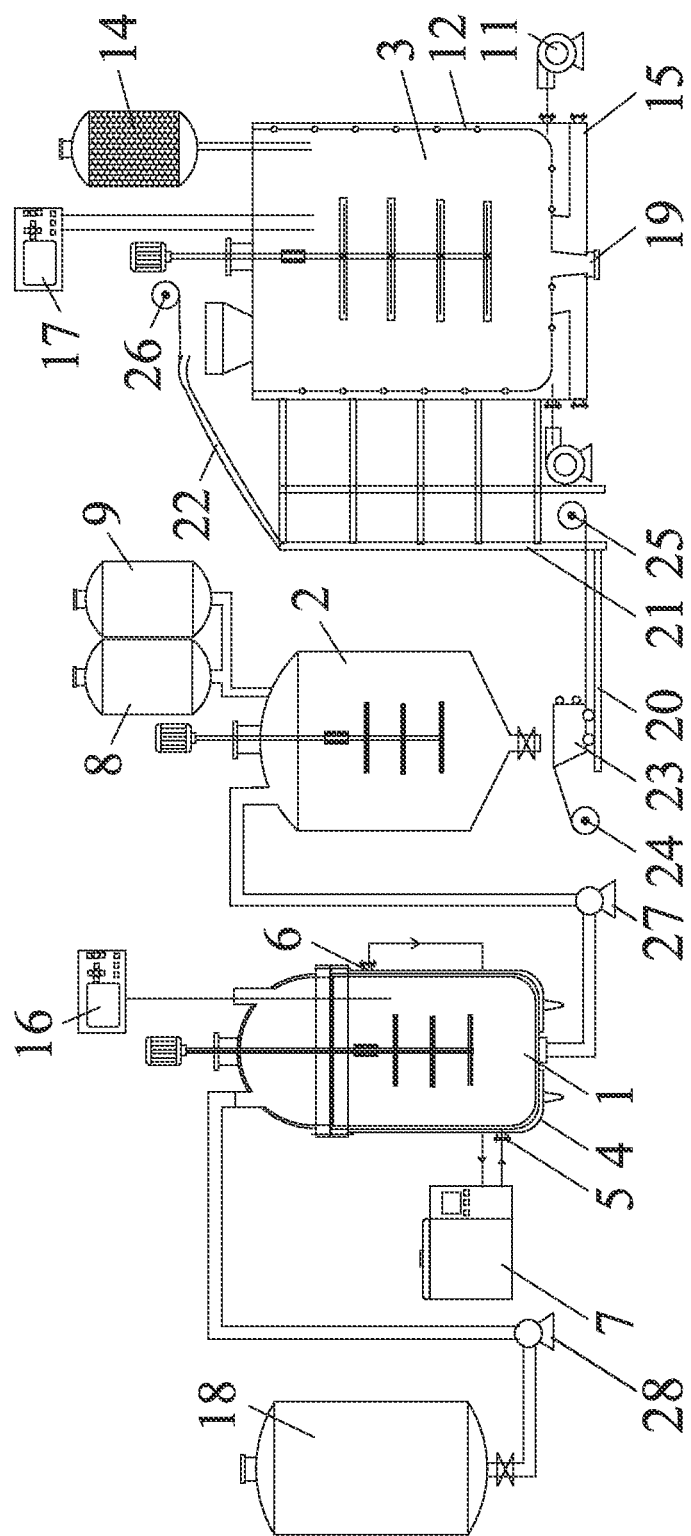
FIG. 2 is schematic diagram of a device for treatment of organic waste comprising a transportation rail and a loading car according to one embodiment of the disclosure.

As shown in FIGS. 1 and 2, the disclosure provides a device for treatment of organic waste. The device comprises a heating unit, a hydrolysis tank 1, a regulating tank 2, an aerobic fermentation reactor 3, an organic waste feeder 8, an aerobe feeder 9, a delivery mechanism, a deodorization unit 14, and an air distributor.

The hydrolysis tank is connected to the regulating tank, and the regulating tank is connected to the aerobic fermentation reactor; the delivery mechanism is disposed between the regulating tank and the aerobic fermentation reactor; the heating unit is connected to the hydrolysis tank 1 and is configured to heat an organic material in the hydrolysis tank; the organic waste feeder 8 and the aerobe feeder 9 are connected to the regulating tank 2 and are configured to regulate a moisture content and carbon-nitrogen (C/N) ratio of the organic material and an inoculation proportion of an aerobe in the regulating tank; the deodorization unit 14 is disposed on and connected to the aerobic fermentation reactor 3 and is configured to absorb odor produced in the aerobic fermentation reactor; the air distributor is disposed in the aerobic fermentation reactor 3 and is configured to provide oxygen to the aerobic fermentation reactor.

The device operates according to the following principle: the organic waste is transported to the hydrolysis tank 1 and mixed with raw materials. The mixture in the hydrolysis tank 1 is heated to a preset temperature (range from 70-100° C.) and undergoes solid state hydrolysis at the preset temperature. After the reaction is complete, the hydrolyzed material is transported to the regulating tank 2 and the organic waste (such as straw) is transported to the regulating tank 2 through the organic waste feeder 8, so that the carbon-nitrogen (C/N) ratio of the organic material reaches a preset value (range from 20:1 to 35:1). A fermenting bacterial agent is transported to the regulating tank 2 through the aerobe feeder 9 and mixed thoroughly. The resulting mixture is transported to and fermented in the aerobic fermentation reactor 3. The fermented material is discharged from the exit 19 of the aerobic fermentation reactor 3 and used as manure for the fields.

The device is equipped with the regulating tank 2 compared with the prior art device. An appropriate amount of the organic waste (such as straw) is transported to the regulating tank 2 and mixed with the hydrolyzed material, so that the carbon-nitrogen (C/N) ratio of the organic material reaches a preset value (range from 20:1 to 35:1). The resulting material accelerates the fermentation process and the degree of the fermentation maturity. Without the regulating tank 2, the activity of the fermenting bacterial agent may reduce due to premature addition of the fermenting bacterial agent, or the degradation efficiency may reduce due to incorrect operation. The combination of the hydrolysis tank 1 and the regulating tank 2 significantly improves the degradation efficiency of the macromolecular substances in organic waste, and reduces the molecular weight and the degree of crystallinity, providing an easy-to-use substrate and optimal environment for the growth and reproduction of microorganisms. The combination of the hydrolysis tank 1 and the aerobic fermentation reactor 3 promotes aerobic decomposition of the organic materials, provides fast heating, keeps the activity of aerobic thermophilic bacteria intact, reduces or prevents leachate contamination, and improves the efficiency in the utilization of nutrients. The combination of the hydrolysis tank 1 and the aerobic fermentation reactor 3 shorten the period of maturity during fermentation, typically to 5-10 days. The combination of the hydrolysis tank 1, the regulating tank 2, and the aerobic fermentation reactor 3 greatly reduces or even prevents the secondary pollution caused by odor during the fermentation process, leads to high-efficiency fermentation, provides advantages of simple operation, large processing capacity, high processing efficiency, adequate safety, and high application value. The organic waste in the hydrolysis tank 1 is hydrolyzed to olyphenols, sugars, and amino acids under high temperature, thereby reducing the crystallinity and molecular weight of difficult-to-degrade organic matter such as lignin and cellulose in the organic waste.

Referring to FIGS. 1 and 2, the device further comprises a first peristaltic pump 27 disposed between the hydrolysis tank 1 and the regulating tank 2. In certain embodiment, the first peristaltic pump configured to transport the materials in the hydrolysis tank 1 to the regulating tank 2.

Referring to FIGS. 1 and 2, the device further comprises an organic waste storage tank 18 connected to the hydrolysis tank 1. The organic waste storage tank 18 is configured to storage the waste generated from agriculture and animal husbandry and domestic premises.

Referring to FIGS. 1 and 2, the device further comprises a second peristaltic pump 28 disposed between the hydrolysis tank 1 and the organic waste storage tank 18, which is configured to transport the materials in the organic waste storage tank 18 to the hydrolysis tank 1.

Referring to FIG. 1, the delivery mechanism comprises a conveyer belt 10. The conveyer belt 10 comprises a first end and a second end; the regulating tank 2 comprises a discharge outlet and the aerobic fermentation reactor 3 comprises a feed inlet. The first end is disposed below the discharge outlet and the second end is disposed over the feed inlet.

Referring to FIG. 2, the delivery mechanism comprises a transportation rail, a loading car 23 movable on the transportation rail, and a driving shaft configured to drive the loading car to move on the transportation rail. The regulating tank 2 comprises a discharge outlet and the aerobic fermentation reactor 3 comprises a feed inlet. The transportation rail comprises a first end and a second end; the first end is disposed below the discharge outlet; the second end is arc-shaped and is disposed over the feed inlet. The loading car 23 is configured to stop on the transportation rail located below the discharge outlet, thereby receiving the materials discharged from the regulating tank 2. The loading car 23 is pulled along the transportation rail by a steel cable, stops over the feed inlet, and throws the materials into the aerobic fermentation reactor 3. The steel cable is connected to the first driving shaft, the second driving shaft, and the third driving shaft. The delivery mechanism of the disclosure occupies a small area, allows to transport large volumes of materials, and reduces the potential for spillage. In certain embodiment, the loading car 23 dumps the materials into the feed inlet when moving up the incline of the arc-shaped part 22.

Figure 3:
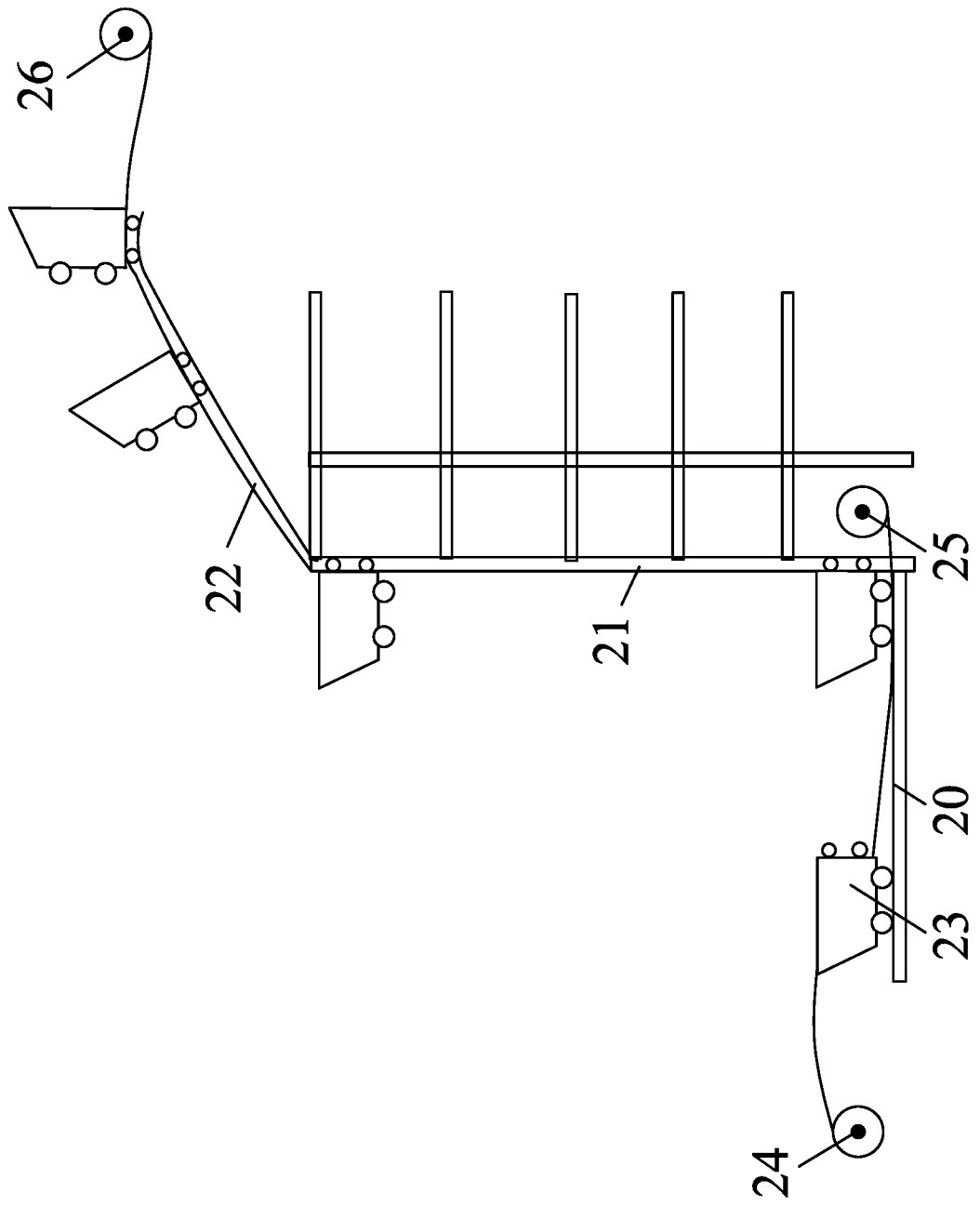
FIG. 3 is a schematic diagram of a delivery mechanism according to one embodiment of the disclosure.

Referring to FIG. 3, the transportation rail comprises a horizontal part 20 disposed below the discharge outlet, a vertical part 21 perpendicularly connected to the horizontal part, and an arc-shaped part 22 disposed over the feed inlet; a first driving shaft 24 and a second driving shaft 25 are disposed on two ends of the horizontal part, respectively, to drive the loading car to move back and forth on the horizontal part; a third driving shaft 26 is disposed on one end of the arc-shaped part to drive the loading car to move back and forth on the horizontal part and vertical part.

In certain embodiment, the loading car 23 is pulled by the first driving shaft 24 through the steel cable, stopped below the discharge outlet, and receives the materials discharged from the regulating tank 2. Then the loading car 23 is pulled by the second driving shaft 25 through the steel cable, move along the horizontal part 20, and stopped below the vertical part 21. Then the loading car 23 is pulled by the third driving shaft 24 through the steel cable, move along the arc-shaped part 22, and dumps the materials into the feed inlet when moving up the incline of the arc-shaped part 22. In certain embodiment, the automatic transportation of the materials from the regulating tank 2 to the aerobic fermentation reactor 3 involves the following parameters: the rotational speeds of the first driving shaft 24, the second driving shaft 25 and the third driving shaft 26; the dwell time for the loading car 23 when receiving the materials, and the interactions of the first driving shaft 24, the second driving shaft 25 and the third driving shaft 26.

Referring to FIGS. 1 and 2, the device further comprises a first stirrer disposed in the hydrolysis tank 1. The first stirrer is configured to ensure a spatially uniform temperature and adequate hydrolysis of the materials in the hydrolysis tank 1.

Referring to FIGS. 1 and 2, the device further comprises a second stirrer disposed in the regulating tank 2. The second stirrer is configured to thoroughly mix the materials in the regulating tank 2, the organic waste added by the organic waste feeder 8, and the aerobic bacteria added by the aerobe feeder 9, thus conducive to adequate fermentation.

Referring to FIGS. 1 and 2, the device further comprises a third stirrer disposed in the aerobic fermentation reactor 3. The third stirrer is configured to ensure that the gas produced from the air distributor comes into close contact with the materials, thus conducive to aerobic fermentation.

Referring to FIGS. 1 and 2, the device further comprises a temperature monitor 16 disposed in the regulating tank 2. The temperature monitor 16 is configured to monitor the temperature of the regulating tank 2 in real-time, so as to prevent the hydrolysis tank 1 from reaching a too high or too low temperature that affects the hydrolysis of the materials.

Referring to FIGS. 1 and 2, the device further comprises a humidity and temperature monitor 17 disposed in the aerobic fermentation reactor 3. The humidity and temperature monitor 17 is configured to monitor the humidity and temperature of the aerobic fermentation reactor 3, so as to judge the fermentation process in the aerobic fermentation reactor 3.

Referring to FIGS. 1 and 2, the heating unit comprises a heating jacket 4 filled with circulating water and a heater 7 communicating with the heating jacket to heat the circulating water. The heating jacket 4 comprises a water inlet 5 and a water outlet 6 both connected to the heater 7. When in use, water discharged from the water outlet 6 flows back to the heater 7, is heated therein, and enters the heating jacket 4 via the water inlet. In certain embodiment, the heating jacket 4 is configured to heat the entire hydrolysis tank 1, ensuring a uniform temperature and equal transfer of heat throughout the entire hydrolysis tank 1.

Referring to FIGS. 1 and 2, the air distributor comprises a U-shaped plate 12 disposed in the aerobic fermentation reactor 3, an interlayer formed between the U-shaped plate 12 and in the aerobic fermentation reactor 3, and an aeration pump 11 communicating with the interlayer. The U-shaped plate comprises a plurality of holes 13 for distributing air. In certain embodiment, the gas pumped by the aeration pump 11 enters the interlayer, flows through the plurality of holes 13 and into the aerobic fermentation reactor 3. The gas passes through the plurality of holes 13 and comes into close contact with the materials, thereby allowing for adequate aeration of the materials in the aerobic fermentation reactor 3 and improving the efficiency of aerobic fermentation.

The air distributor comprises a plurality of aeration pumps 11.

In certain embodiment, each of the plurality of aeration pumps 11 aerates the aerobic fermentation reactor 3 according to a preset amount of gas aeration.

Referring to FIGS. 1 and 2, the device further comprises a collector 15 disposed below the aerobic fermentation reactor 3 that is configured to collect a leachate produced from the aerobic fermentation reactor. The collected leachate may be transported to the hydrolysis tank 1 for secondary hydrolysis and fermentation, thereby preventing leachate contamination.

Referring to FIGS. 1 and 2, the collector 15 is disposed below the U-shaped plate. The leachate passes through the plurality of holes and is collected by the collector 15; and the collector is fixedly secured to the U-shaped plate. The leachate may be directly collected by the collector 15, thereby preventing leakage of the leachate.

It will be obvious to those skilled in the art that changes and modifications may be made, and therefore, the aim in the appended claims is to cover all such changes and modifications.

What is claimed is:
1. A device, comprising:
 1) a heating unit;
 2) a hydrolysis tank;
 3) an organic waste feeder;
 4) an aerobe feeder;

5) a regulating tank comprising a discharge outlet;
6) a delivery mechanism;
7) an aerobic fermentation reactor comprising a feed inlet;
8) a deodorization unit;
9) an air distributor;

wherein:
the hydrolysis tank is connected to the regulating tank, and the regulating tank is connected to the aerobic fermentation reactor;
the heating unit is connected to the hydrolysis tank and is configured to heat an organic material in the hydrolysis tank;
the organic waste feeder and the aerobe feeder are connected to the regulating tank and are configured to regulate a moisture content and carbon-nitrogen (C/N) ratio of the organic material and an inoculation proportion of an aerobe in the regulating tank;
the deodorization unit is disposed on and connected to the aerobic fermentation reactor and is configured to absorb odor produced in the aerobic fermentation reactor;
the air distributor is disposed in the aerobic fermentation reactor and is configured to provide oxygen to the aerobic fermentation reactor;
the delivery mechanism is disposed between the regulating tank and the aerobic fermentation reactor, and comprises a transportation rail, a loading car movable on the transportation rail, a first driving shaft, a second driving shaft, and a third driving shaft;
the transportation rail comprises a horizontal part disposed below the discharge outlet, a vertical part perpendicularly connected to the horizontal part, and an arc-shaped part disposed over the feed inlet;
the first driving shaft and the second driving shaft are disposed on two ends of the horizontal part, respectively, to drive the loading car to move back and forth on the horizontal part; and
the third driving shaft is disposed on one end of the arc-shaped part to drive the loading car to move back and forth on the horizontal part and the vertical part.

2. The device of claim 1, wherein the device further comprises a stirrer disposed in the hydrolysis tank and/or in the regulating tank and/or in the aerobic fermentation reactor.

3. The device of claim 1, wherein the device further comprises a temperature monitor disposed in the hydrolysis tank.

4. The device of claim 1, wherein the device further comprises a humidity and temperature monitor disposed in the aerobic fermentation reactor.

5. The device of claim 1, wherein the heating unit comprises a heating jacket filled with circulating water and a heater communicating with the heating jacket to heat the circulating water; the heating jacket is disposed around the hydrolysis tank; the heating jacket comprises a water inlet and a water outlet both connected to the heater; when in use, water discharged from the water outlet flows back to the heater, is heated therein, and enters the heating jacket via the water inlet.

6. The device of claim 1, wherein the air distributor comprises a U-shaped plate disposed in the aerobic fermentation reactor; the U-shaped plate comprises a plurality of holes for distributing air.

7. The device of claim 6, further comprising a collector disposed below the aerobic fermentation reactor configured to collect a leachate produced from the aerobic fermentation reactor.

8. The device of claim 7, wherein the collector is disposed below the U-shaped plate; the leachate passes through the plurality of holes and is collected by the collector; and the collector is fixedly secured to the U-shaped plate.

9. The device of claim 8, wherein the air distributor comprises a plurality of aeration pumps.

10. The device of claim 1, wherein the device further comprises:
a first peristaltic pump disposed between the hydrolysis tank and the regulating tank, and
an organic waste storage tank connected to the hydrolysis tank.

11. The device of claim 10, wherein the device further comprises a second peristaltic pump disposed between the hydrolysis tank and the organic waste storage tank.

* * * * *